J. J. WOHLGEMUTH AND L. L. KORACH.
TIRE MOLDING AND VULCANIZING PRESS.
APPLICATION FILED OCT. 30, 1918.
1,317,849.
Patented Oct. 7, 1919.
2 SHEETS—SHEET 1.
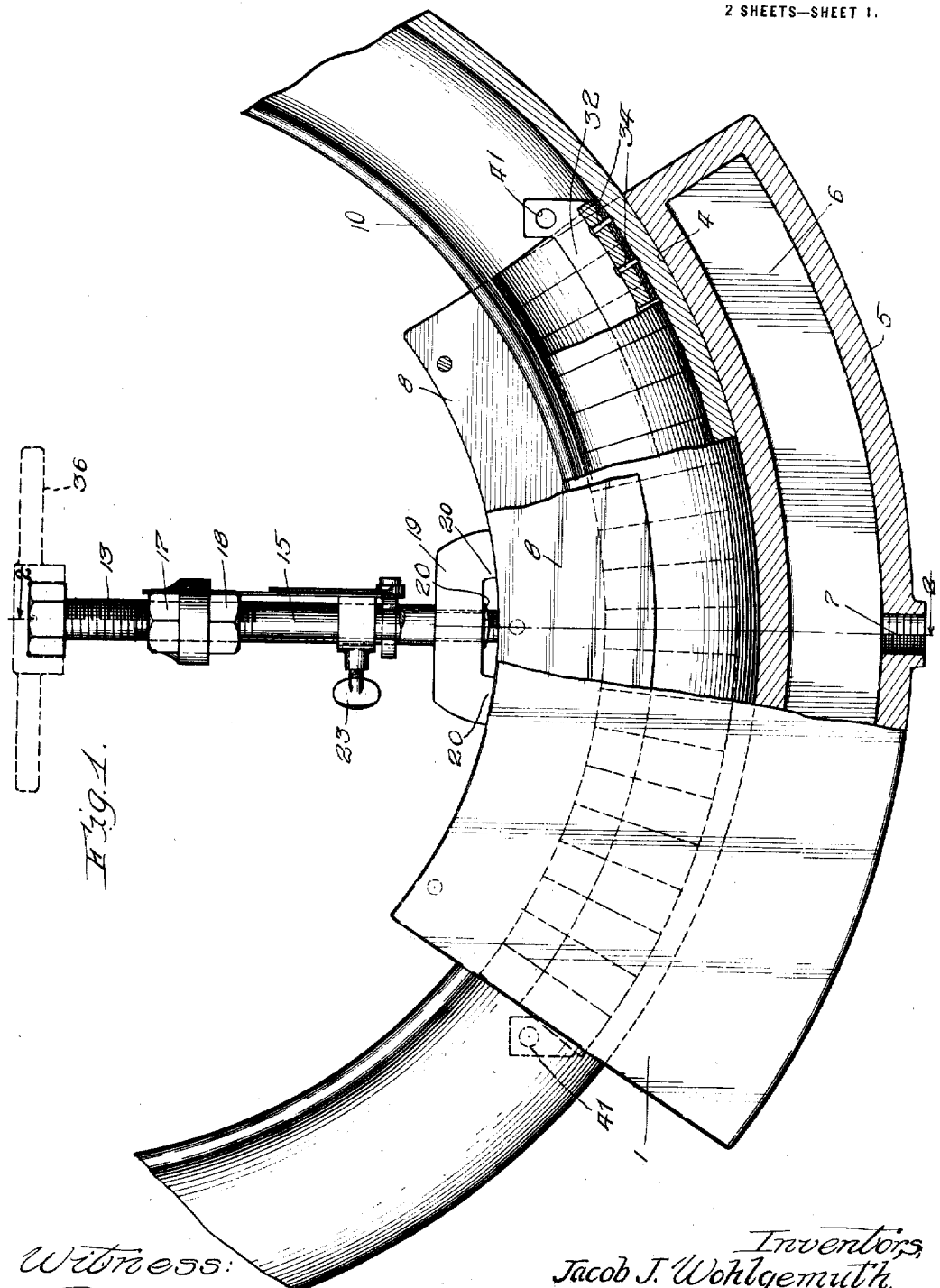

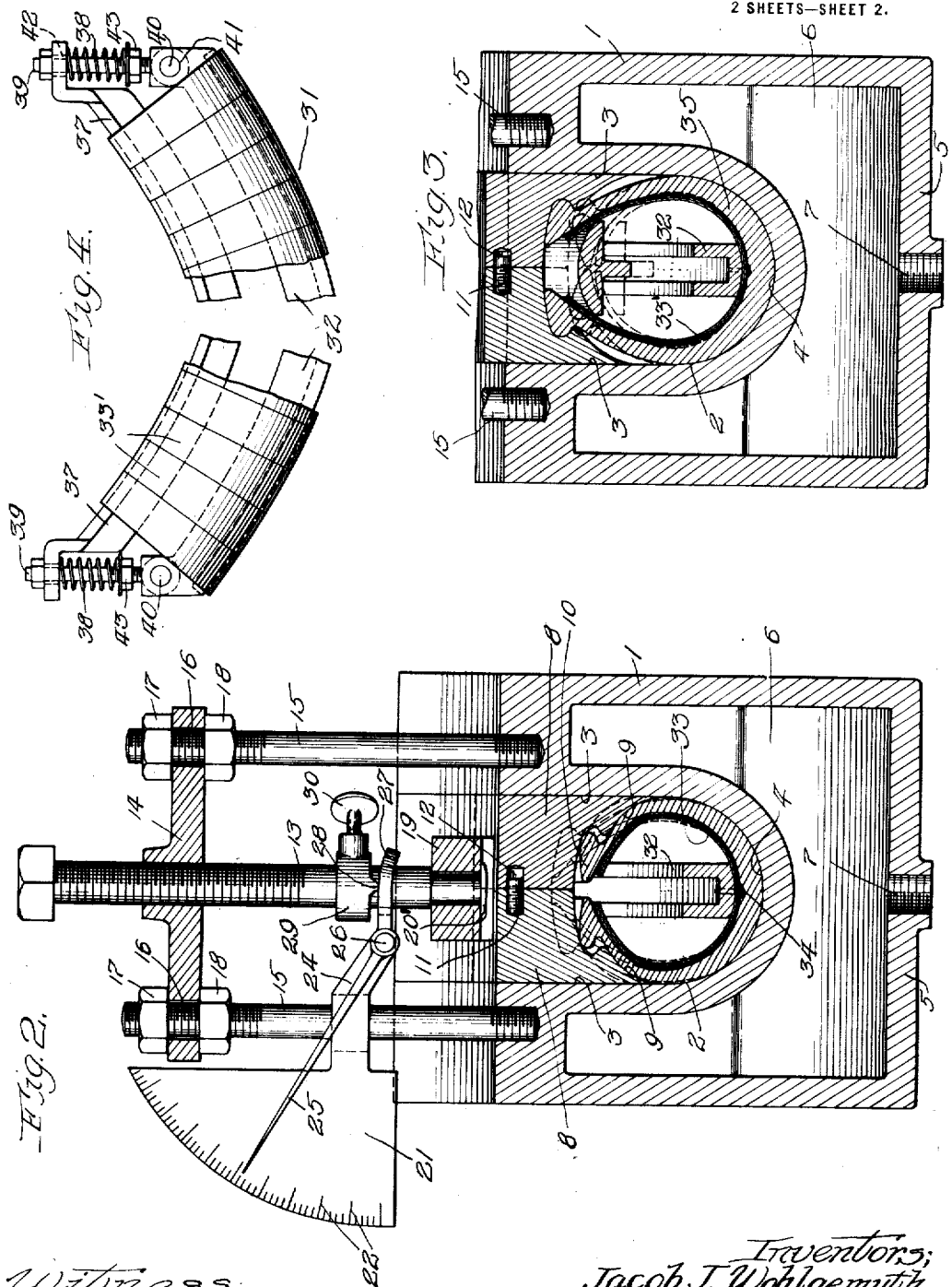

UNITED STATES PATENT OFFICE.

JACOB J. WOHLGEMUTH AND LOUIS L. KORACH, OF CHICAGO, ILLINOIS; SAID KORACH ASSIGNOR TO SAID WOHLGEMUTH.

TIRE MOLDING AND VULCANIZING PRESS.

1,317,849.   Specification of Letters Patent.   Patented Oct. 7, 1919.

Application filed October 30, 1918. Serial No. 260,317.

*To all whom it may concern:*

Be it known that we, JACOB J. WOHLGEMUTH and LOUIS L. KORACH, both citizens of the United States, residing in Chicago, in the county of Cook and State of Illinois, have invented certain new and useful Improvements in Tire Molding and Vulcanizing Presses, of which the following is a specification.

This invention relates to that class of tire molding and vulcanizing presses which may be used for repairing, or molding and vulcanizing tires, or the tread or other part or parts of tires, such, for instance, as the flexible hollow tires or casings for wheels of automobiles or other vehicles.

The principal object of this invention is to provide a simple, economical and efficient tire molding and vulcanizing press.

A further object of the invention is to provide a tire molding and vulcanizing press suitable for use for repairing and capable of being used for retreading, or for molding and vulcanizing flexible or resilient tires, or the tread or other part or parts of tires or casings formed in part of or containing rubber, and adapted to enable the desired degree and uniformity of pressure to be applied to the desired part or parts of tires or casings to be operated upon, and to provide simple and efficient means for indicating the degree of pressure applied during the process of repairing, retreading, or molding and vulcanizing such tires or tire parts, all in a simple, efficient and economical manner.

Other and further objects of the invention will appear from the following description and claims, and from an inspection of the accompanying drawings, which are made a part hereof.

The invention consists in the features, combinations, and details of construction herein described and claimed.

In the accompanying drawings:

Figure 1, is a view in side elevation of a tire molding and vulcanizing press constructed in accordance with our invention, showing a tire in place in the mold, the portion of the tire at the right in said figure being shown in central vertical section. A portion of the inner core at the right extremity of said figure is shown in side elevation, with parts broken away and shown in central vertical section; and the main or outer mold member which forms the mold chamber walls is shown in side elevation, at the left and in central vertical section at the right of said figure.

Fig. 2 is a view in transverse vertical section taken on line 2 of Fig. 1.

Fig. 3 is a view in transverse vertical section showing a tire molding and vulcanizing press such as is shown in Figs. 1 and 2, with parts omitted, and with a relatively large inner core and corresponding removable auxiliary mold.

Fig. 4 is a detail view in side elevation of an inner core such as is shown in Figs. 1, 2 and 3, but with an additional inner core member in the form of a spring pressed pressure rib which is shown in Fig. 3, but dispensed with in the device shown in Figs. 1 and 2.

In constructing a tire molding and vulcanizing press in accordance with our invention, we provide a main outer mold member 1 which is curved or of segmental form, having a curvature corresponding with the normal curvature of a tire to be repaired, retreaded, or molded and vulcanized, and forming a curved mold chamber 2 having side mold chamber walls 3, 3, and a concave bottom or tread-forming mold chamber wall portion 4, all formed by said outer mold member 1. The outer mold member 1 also comprises in its construction an outer steam jacket 5 having a steam-containing chamber 6 which surrounds the principal part of the mold chamber and has a steam inlet 7 adapted to be connected with a source of steam supply, for furnishing steam to heat the mold chamber in the operation of repairing, retreading, or molding and vulcanizing tires or tire parts, in the mold chamber.

Auxiliary mold members 8, having concave side flange portions 9 of the required curvature to properly engage and hold in place a tire 10 inserted in the mold chamber in position to be operated upon, are slidably mounted between the parallel side wall portions or side walls 3 of the mold chamber or main outer mold member, and are provided with suitable dowel pins 11 inserted in recesses 12, for holding said auxiliary mold members 8 in proper fixed operative relation to each other.

Suitable pressure mechanism is provided, for pressing the inner auxiliary mold members 8 inward in operative engagement with the tire to be operated upon, so as to hold the tire under pressure and in engagement with the periphery of the inner curved core and cause the tire to be held under pressure between the core and the mold chamber walls, as hereinafter more particularly described. The pressure mechanism may be and is, by preference, in the form of a clamping or pressure screw 13, which is mounted in threaded engagement with a supporting frame member or head 14 supported upon and in fixed relation to the main outer mold member 1 by means of standards 15, which may be in the form of threaded rods each having one end anchored in and in threaded engagement with the main outer mold member 1, and its opposite or outer end inserted through a suitable opening 16 in the head 14, and held in place by means of outer nuts 17 and inner nuts 18 which engage the outer and inner faces of the head member respectively, there being a pair of said nuts 17 and 18 in threaded engagement with each of said threaded rods.

The pressure or clamping screw 13 has its inner end journaled in or in rotative engagement with a clamping member 19 having its opposite legs or extremities 20, 20 in engagement with the outer concave faces of the auxiliary mold members 8, the screw being, by preference, provided with a head 20' which engages the inner side of the clamping member or jaw 19, so as to hold the clamping jaw, and prevent the latter from becoming disconnected from the screw.

Pressure indicator mechanism is provided, for indicating the degree of pressure applied by means of the mechanism above described co-acting with the flexible or expansible core hereinafter described, to hold the tire to be operated upon under the desired predetermined uniform pressure in the mold chamber during treatment. The pressure indicator mechanism may be of any desired ordinary and well known or suitable form, and when constructed as shown in the drawings, consists of a suitable scale member 21 which may be in the form of a segmental plate secured to a suitable support, such, for instance as one of the studs or threaded rods 15, and having a series of graduation marks 22, suitably designated by means of numbers or indicator characters, to indicate the degree of pressure applied to the tire. The gage 21 may be adjustably secured to its support by means of a suitable set screw 23 mounted in a projecting arm or bracket member 24 which may be formed in one integral piece with the gage plate 21, said arm having a suitable opening adapted to admit the stationary support 15. An indicator hand or pointer 25 is pivotally mounted on the projecting arm portion 24 of the gage plate 21, by means of a pivot pin 26, and has a lever arm 27 which is engaged by a shoulder 28 on an adjustable stop in the form of a collar 29 which encircles and is adjustably secured to the pressure screw 13 by means of a set screw 30.

A laterally expansible core 31 is provided, which, in its preferred form, is constructed as follows: A curved rigid inner core member in the form of a metallic arm, rod or bar 32, which may be of hollow construction or U-shaped in cross-section, so as to provide the maximum degree of rigidity and strength in proportion to weight, and which is here shown in the form of a channel iron bent into the form of a segment of a circle corresponding to the curvature of the tires to be operated upon, but adapted to be inserted in position inside of a tire arranged in the mold chamber, and to be used in the operation of vulcanizing tires which may vary to some extent in diameter or in cross-section. Fixed to this bar or rigid core member 32—preferably to the outer or convex curved side thereof—is a series of curved peripheral springs 33. Each of these springs is secured at or near its longitudinal center to the core member 32 by means of suitable rivets, or other similar or suitable securing means 34. The springs are each bent into an approximately circular form, so as to partially encircle the rigid core member 32, the free ends of each of said springs being located on the inner or concave side of the curved rigid core member 32, or intermediate the said rigid core member and the pressure screw 13 and movable mold members 8, and being freely movable toward and from the inner or concave side of said rigid inner core member 32, and so constructed and arranged as to operatively engage the inside wall of a tire. The normal position of the springs 33, in which their free ends are somewhat spread apart, is indicated in broken lines in Fig. 2, and in full lines in Fig. 3. It is plain that the pressure screw 13 may be turned, by means of a wrench 36, or other suitable operating means, so as to bring it and the auxiliary mold members 8 to the position in which they are shown in Fig. 2, thus causing the inner margins of the tire 10 and the free ends of the springs 33 to be pressed inward or toward the center of the mold chamber and toward the inner concave side of the rigid curved inner core member 32, from the position indicated in broken lines in Fig. 2 to the position indicated in full lines in said figure. This movement of the ends of the springs will cause a corresponding transverse expansion or outward pressure on diametrically opposite sides of the center of the curved core and hold the tire under pressure. It is obvious that the flexible peripheral core members, by reason of the tendency to press outward while held at a tension during the operation of vulcanizing a tire, are adapted to automatically expand or move outward and to follow up any outward movement or shrinking or yielding of the tire which may accompany the treatment of the tire in the mold chamber while subjected to pressure and to the action of heat such as will enable the tire to be properly repaired.

The rigid inner core member or channel iron 32 shown in Figs. 3 and 4, is identical with the core member 32 shown in Figs. 1 and 2; and the springs 33' shown in Figs. 3 and 4 are identical with springs 33 shown in Figs. 1 and 2, except that the springs 33' are larger, making a core of somewhat larger diameter than that shown in Figs. 1 and 2, but adapted to be used in the same mold chamber interchangeably with the core shown in said Figs. 1 and 2. In Figs. 3 and 4, however, is shown an additional core member which is not shown in Figs. 1 and 2, and which may be dispensed with when desired without detriment to the apparatus. The additional core member referred to is the inner curved bar 37 which is arranged on the inside of the spring core members 33' in engagement with their inner surfaces near or at the free ends of the springs, and in parallel relation to the main rigid core member or curved bar 32 already described. At each end of the bar 37 is a compression spring 38 held in operative position by means of an eye-bolt 39 which is connected with the corresponding end of the main core member 32 by means of a pin 40, which extends through openings 41 in the rigid core member 32 and through the eye of the eye-bolt. Each of the eye-bolts extends loosely through an opening 42 in the corresponding end of the curved bar 37; and upon each eye-bolt is a threaded adjusting nut 43 in engagement with the end of the spring nearest to the main rigid core member 32, and adapted to hold the spring at any desired tension, so as to cause the shoe to be held by the tension of the springs in yielding engagement with the inner extremities of the springs 33 or 33' as the case may be. The springs 38 thus tend to press the bar 37 and the free ends of the springs engaged by the shoe in a direction opposite to the direction in which the free ends of the springs are pressed by the action of the pressure screw 13. Springs which are not sufficiently strong to afford the desired pressure against the margins of the tire at or near the free ends of the springs, are thus pressed against the inner face of the tire by the action of the spring-pressed shoe 37 and its springs 38 in such a manner as to increase the pressure on the tire near the ends of the springs 33 or 33' in proportion to the degree of pressure afforded by other parts of said springs at points between their free ends and their points of connection with the main rigid core member or bar 32.

It is obvious that by adjusting the shouldered sleeve 29 so that it will engage the lever 27 when the indicator hand 25 is at zero or the first graduation mark on the graduated indicator member, with the mold members 8 and spring core members 33 in the position indicated in broken lines in Fig. 2, and then turning the pressure screw in the direction necessary to compress the springs which form the periphery of the core to a sufficient extent to afford the desired pressure, and noting the point reached by the indicator hand when the desired degree of pressure is obtained, any and all parts of the tire may be successively placed in position in the mold and subjected to the same degree of pressure, or to any desired pressure, and the degree of pressure will be in all cases indicated in a simple, efficient and practical manner by the pressure indicator mechanism above described.

We claim:

1. In a device of the class described, a core comprising a rigid inner member and a plurality of curved springs secured to said inner member, said springs being disposed in loop form with their ends spaced apart sufficiently to prevent coming together in use, movable toward each other in use and forming resilient core portions adapted to admit a tire between said core and mold chamber walls, and means exerting pressure to cause the core to press the tire against the mold walls.

2. A tire core comprising a plurality of curved springs disposed side by side with the ends of the springs spaced apart, two substantially concentric members in said springs, one of said members being secured to intermediate parts of the springs and the other member engaging the end portions of the springs, and means connecting said members together.

3. A tire core comprising a plurality of curved springs disposed side by side with the ends of the springs spaced apart, two substantially concentric members in said springs, one of said members being secured to intermediate parts of the springs and the other member engaging the end portions of the springs, means limiting the movements of said members away from each other, and resilient means between said members tending to separate the latter.

4. A tire core comprising a rigid curved arm and a series of curved springs, each partially encircling and having its central portion secured to the outer side of said rigid curved arm, the ends of each of said springs being spaced apart sufficient to prevent coming together in use and freely movable toward and away from each other and the inner side of the rigid curved arm.

5. In a device of the class described, a core comprising a rigid curved arm and a series of curved springs, each partially encircling and having its central portion secured to said rigid curved arm with the ends of said springs spaced apart, a curved bar disposed within said springs and engaging the end portions of said springs, and means connecting each end of said curved rigid member with one end of said bar.

6. In combination, a tire mold, bead molds in the tire mold, clamping means adapted to move the bead molds toward the bottom of the tire mold, a core between said molds with a tire space between said molds and such core, said core being made up of a plurality of sheet metal springs with each spring disposed in loop form and secured together, and a bar engaging the end portions of said springs adapted to resist the movement of the spring ends inwardly of the core.

7. In combination, a tire core comprising a plurality of sheet metal springs with each spring disposed in loop form, bead molds adapted to engage the beads and portions along the beads of a tire, a bar securing the springs together, a bar substantially concentric with the first-mentioned bar, and resilient means between end portions of said bars tending to press such bars apart.

Signed at Chicago, in the county of Cook and State of Illinois, this 25th day of October, 1918.

JACOB J. WOHLGEMUTH.
LOUIS L. KORACH.

Witnesses:
DAVID H. FLETCHER,
W. HARDING.